Nov. 11, 1941.  L. LEVANDOWSKI  2,262,506

HEATER FOR BEER AND ALE MULLS

Filed Sept. 8, 1941

Louis Levandowski
INVENTOR

BY Victor J. Evans & Co.
ATTORNEYS

WITNESS

Patented Nov. 11, 1941

2,262,506

UNITED STATES PATENT OFFICE 2,262,506

HEATER FOR BEER AND ALE MULLS

Louis Levandowski, Rib Mountain, Wis.

Application September 8, 1941, Serial No. 410,093

2 Claims. (Cl. 219—22)

The present invention relates to improvements in electrical heating devices and more particularly to such device adapted to heat metal rods for use in mulling beer and ale.

It is presently customary in certain instances to heat beverages such as beer, ale and wine. One form of heating the beverage is through the use of metal rods which have been preheated, the rods being inserted in the neck of the bottle or glass. The present invention has been primarily designed as a receptacle and heater for the metal rods.

It is, therefore, an important object of the invention to provide a receptacle and stand embodying means for supporting and heating metal rods to a degree sufficient to properly heat beverages such as beer, ale and wine.

A further object of the invention is to provide improved means in the cover of the receptacle for maintaining the rods out of contact with the electrical heating element forming a part of the receptacle.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which.

Figure 1:
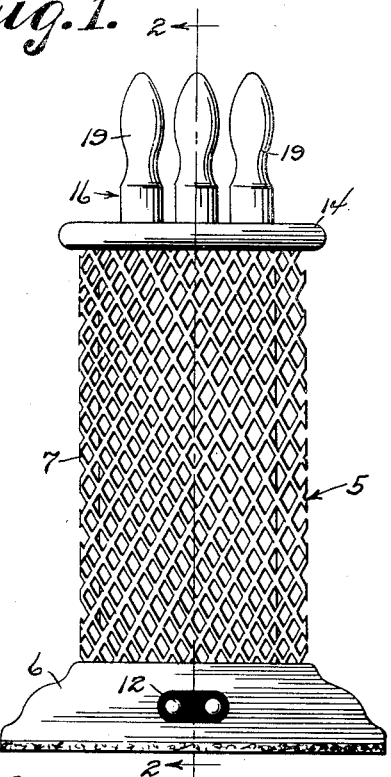
Figure 1 is a side elevational view of an electrical heating device embodying the features of the present invention.

Referring to the drawing for a more detailed description thereof, the heating device is generally designated in the several views by the reference numeral 5 and comprises a base 6 formed of metal or the like on which is supported a frame 7 of cylindrical grill work. The frame 7 extends upwardly from the base and is attached thereto by any desired means, the interior of said frame being hollow as indicated at 8 in Figure 2 of the drawing.

An electrical heating element 9 of conventional construction is mounted on the base and extends upwardly therefrom within the frame 7, a screw or similar fastening element 10 being provided for securing said element to the base. The heating element 9 includes a coil of resistance wire 11, the ends of which are attached to terminals 12 which project from the base 6. The terminals 12 are so arranged with respect to each other as to make connection with a coupling socket carried by a flexible conductor which may be connected in the ordinary incandescent lamp circuit.

The interior of the frame 7 is suitably lined with an insulating jacket 13 for retaining the heat from the heating element within the space 8 and said jacket is secured to the frame by any desired means.

The frame 7 is provided with a cover 14 which rests upon the upper end thereof and is detachably connected thereto. The cover 14 is formed with a multiplicity of openings 15 through which the metal rods 16 are inserted, said rods to be heated by the element 9. The inner face of the cover 14 has a stem 17 depending therefrom to which is attached an enlarged frusto-conical shaped member 18, said member adapted to overlie the upper end of the heating element 9. The member 18 functions to maintain the rods 16 out of contact with the element 9 as said rods are positioned within the space 8.

Figure 2:
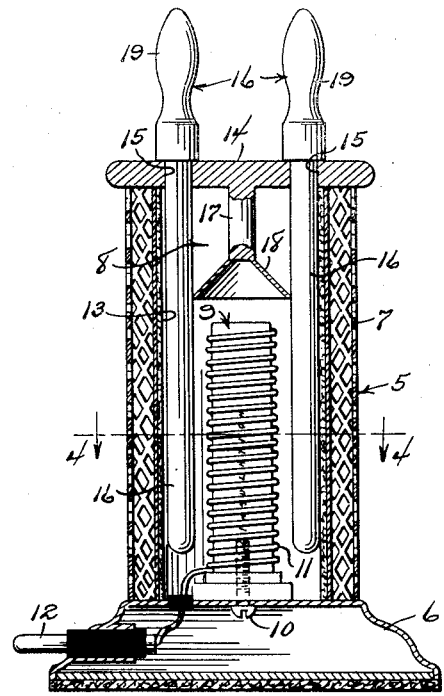
Figure 2 is a vertical sectional view taken substantially on line 2—2 of Figure 1.
Figure 3:
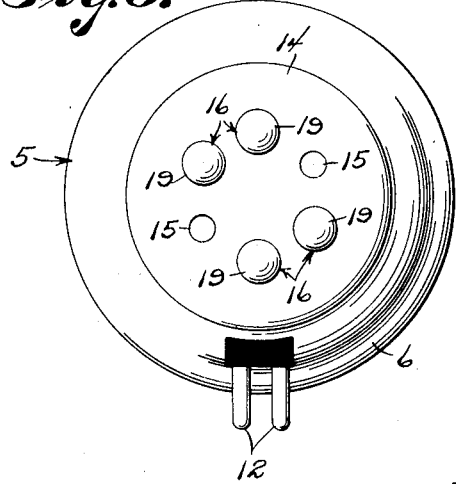
Figure 3 is a top plan view of the device.
Figure 4:
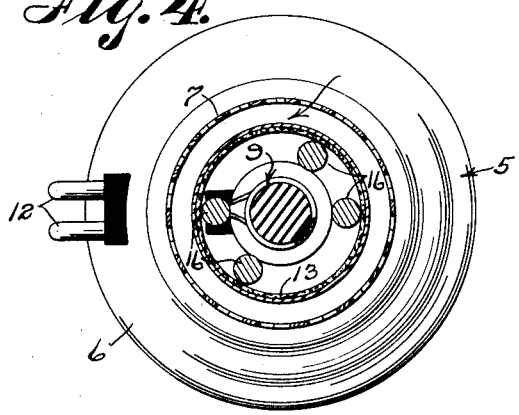
Figure 4 is a horizontal sectional view taken substantially on line 4—4 of Figure 2.

The rods 16 are formed with insulating handles 19 to be gripped when positioning or removing the rods relative to the cover 14. The handles 19 are of a shape and size to limit the distance at which the rods can be inserted within the space 8. In other words, the diameter of the handles 19 is greater than that of the shank portions of the rod, to provide annular shoulders to rest upon the cover with the shank portions depending within the space 8, as shown in Figure 2.

It is thought that the use and operation of the invention is readily apparent from the above description when taken in connection with the accompanying drawing. The entire device presents an attractive article that can be placed on a table, bar or similar support. When desiring to warm beer or ale that has been previously chilled, one of the rods 16 is removed from the receptacle and inserted in the neck of the bottle or glass. After use the rod is repositioned in the receptacle to be preheated in the manner previously described. With the terminals 12 connected to a source of supply, the heating element 9 is always ready for instantaneous use. The frusto-conical shaped member 18 prevents contact of the metal rods with the heating element at all times.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as to not affect the spirit of the invention nor exceed the scope thereof as expressed in the appended claims.

What is claimed is:

1. A heating receptacle of the character described comprising a base, a heating element attached to and extending upwardly from said base, an insulated cylinder secured to said base and surrounding said element, a cover detachably connected to said cylinder, a stem depending from said cover within said cylinder, a frusto-conical shaped member attached to said stem, and means in said cover whereby articles may be suspended within said cylinder to be heated by said element, said conical shaped member maintaining said articles out of contact with said heating element.

2. A device of the character described comprising a heating receptacle including a base, a heating element secured to and rising centrally from the base, a grill work cylinder secured to and rising from the base in surrounding spaced relation to said element, a lining of insulating material for said cylinder, a cover resting on and secured to said cylinder and having a plurality of openings therein, liquid mulling rods for passage through the openings, said openings being arranged for disposal of the rods in surrounding relation about said element, handles for the rods and to rest upon the cover for supporting the rods in depending relation therefrom, a stem secured to and depending centrally from said cover, and a frusto-conical shaped member secured to the lower end of the stem for spacing the rods from said element.

LOUIS LEVANDOWSKI.